United States Patent
Puig Serrano et al.

(10) Patent No.: US 11,104,746 B2
(45) Date of Patent: Aug. 31, 2021

(54) PROCESS FOR THE SYNTHESIS OF A CYCLODEXTRIN DERIVATIVE

(71) Applicant: MEDICHEM, S.A., Barcelona (ES)

(72) Inventors: Jordi Puig Serrano, Gerona (ES); Jordi Bosch I Llado, Girona (ES); Iteng Ng Choi, Girona (ES); Ernesto Duran López, Barcelona (ES)

(73) Assignee: Medichem, S.A., Barcelona (ES)

( * ) Notice: Subject to any disclaimer, the term of this patent is extended or adjusted under 35 U.S.C. 154(b) by 0 days.

(21) Appl. No.: 16/766,369

(22) PCT Filed: Nov. 26, 2018

(86) PCT No.: PCT/EP2018/082598
§ 371 (c)(1),
(2) Date: May 22, 2020

(87) PCT Pub. No.: WO2019/102009
PCT Pub. Date: May 31, 2019

(65) Prior Publication Data
US 2020/0377621 A1    Dec. 3, 2020

(30) Foreign Application Priority Data

Nov. 27, 2017 (EP) .................................... 17382802

(51) Int. Cl.
*C08B 37/16* (2006.01)
*C08L 5/16* (2006.01)

(52) U.S. Cl.
CPC ............ *C08B 37/0012* (2013.01); *C08L 5/16* (2013.01)

(58) Field of Classification Search
None
See application file for complete search history.

(56) References Cited

U.S. PATENT DOCUMENTS

| | | |
|---|---|---|
| RE44,733 E | 1/2014 | Zhang |
| 9,120,876 B2 | 9/2015 | Davuluri |

FOREIGN PATENT DOCUMENTS

| | | |
|---|---|---|
| CN | 106749771 | 5/2017 |
| JP | 2008203357 | 9/2008 |
| WO | WO2014/125501 | 8/2014 |
| WO | WO2016/194001 | 12/2016 |
| WO | WO2017/0084401 | 5/2017 |
| WO | WO2017/089966 | 6/2017 |
| WO | WO2017/144734 | 8/2017 |
| WO | WO2017/163165 | 9/2017 |
| WO | WO2018/136013 | 7/2018 |
| WO | WO2018/185784 | 10/2018 |

OTHER PUBLICATIONS

Gennaro et al., Remington's Pharmaceutical Sciences, 18th ed., Mack Publishing Company, 1990, Part 8: Pharmaceutical Preparations and Their Manufacture; pp. 1545-1580.
Bulletin de la Societe Chimique de France, 1995, 132, 857-866.
Bridion's Chemistry Review Data Sheet of the FDA, Nov. 16, 2007.
Gennaro, A.P. et al. Remington's Pharmaceutical Sciences, 18th ed., Part 8: Pharmaceutical Preparations and Their Manufacture, "Chapter 84: Parenteral Preparations," Mack Publishing Company, 1990, pp. 1545-1569.
Gennaro, A.R. et al. Remington's Pharmaceutical Sciences, 18th ed., Part 8: Pharmaceutical Preparations and Their Manufacture, "Chapter 85: Intravenous Admixtures," Mack Publishing Company, 1990, pp. 1570-1580.

*Primary Examiner* — Layla D Berry
(74) *Attorney, Agent, or Firm* — Gary J. Gershik; Cooper & Dunham LLP

(57) ABSTRACT

This invention relates to an improved process for the synthesis of Sugammadex or a salt thereof, to Sugammadex or a salt thereof having high purity as obtained by said process and to pharmaceutical compositions comprising said high purity Sugammadex or a salt thereof.

22 Claims, 4 Drawing Sheets

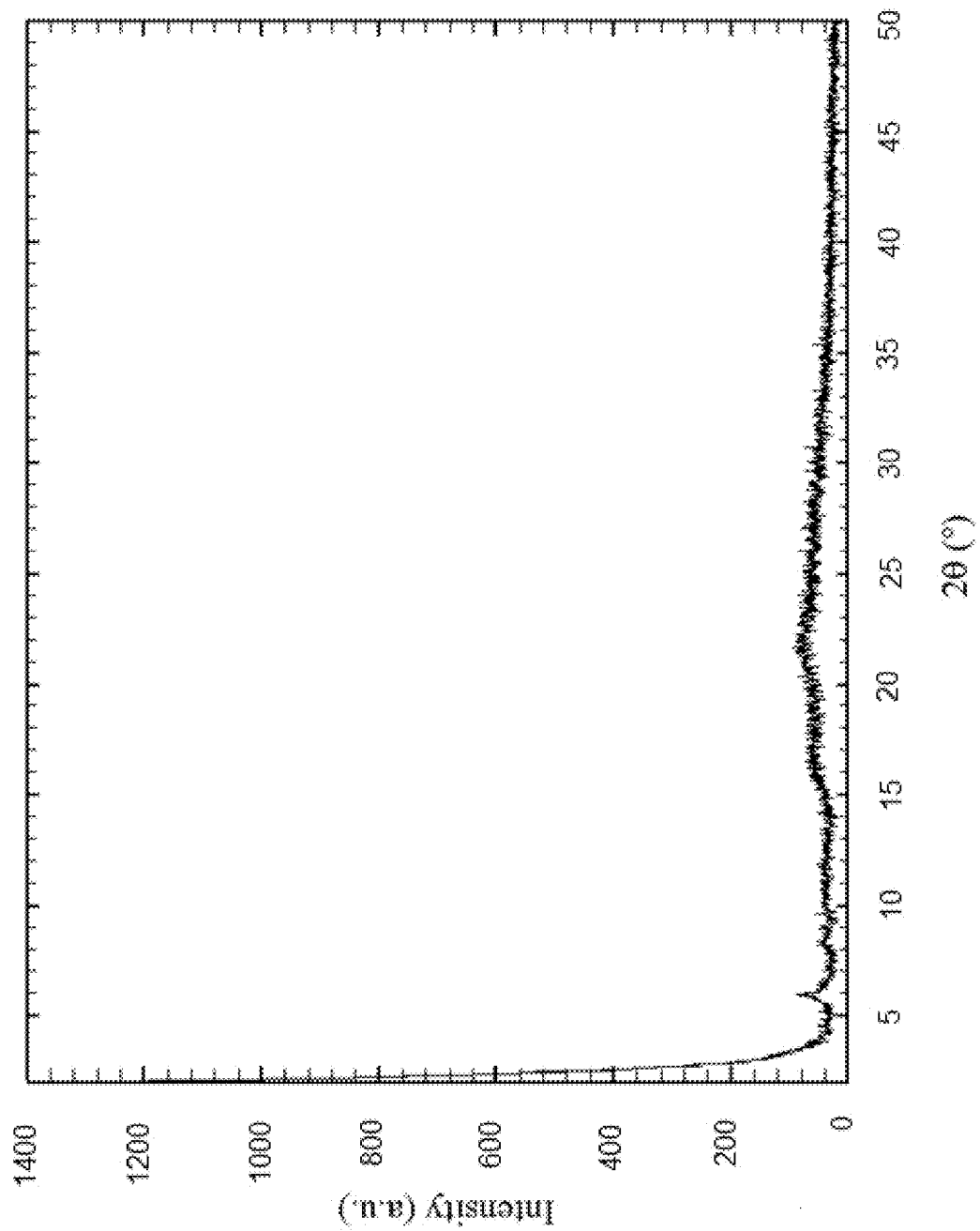
Figure 1. XRPD diffractogram of 6-*per*-deoxy-6-*per*-chloro-γ-cyclodextrin obtained according to example 1 (compound II-A).

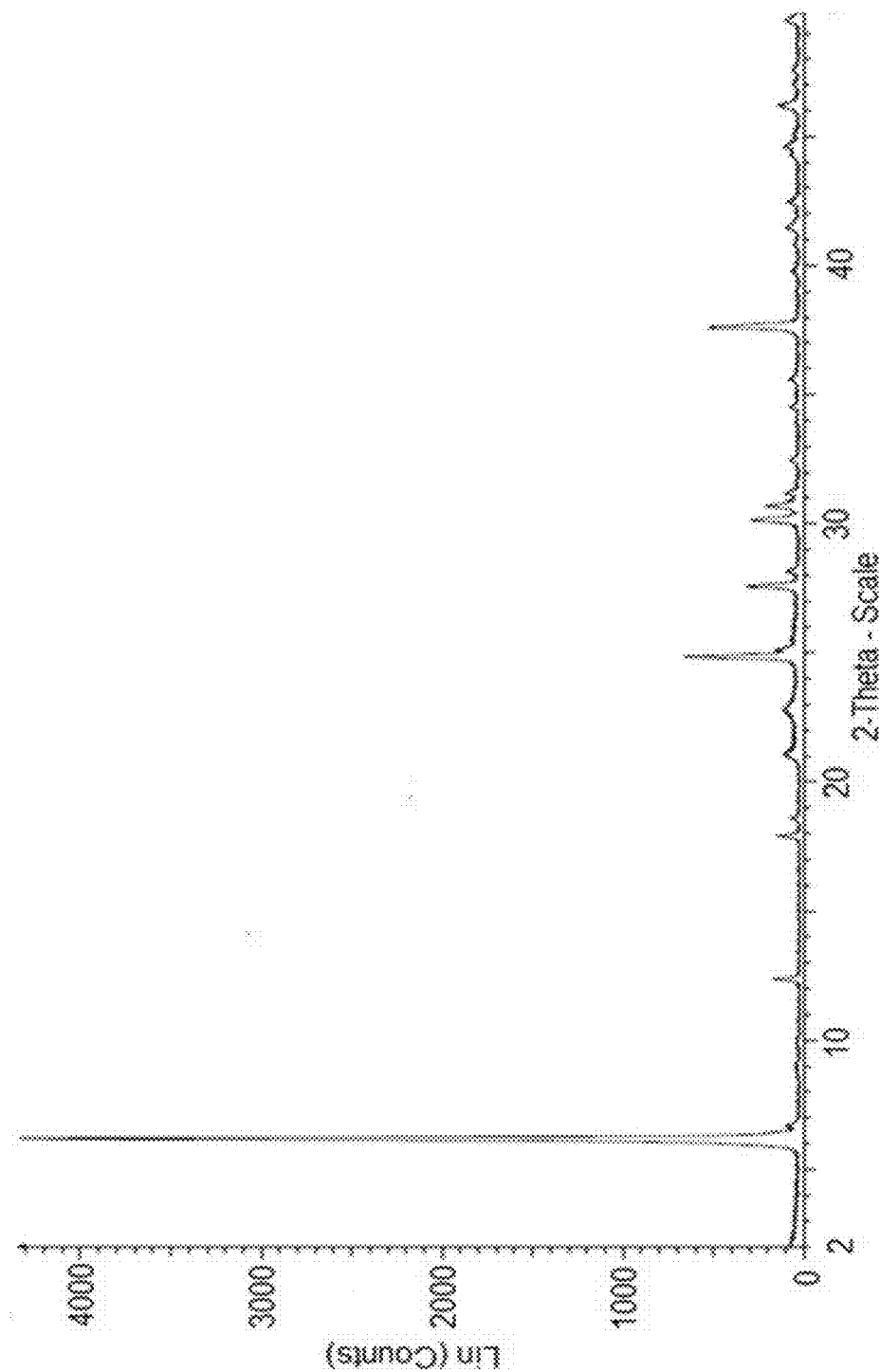
Figure 2. XRPD diffractogram of mono-sodium salt of 3-mercaptopropionic acid (compound IV-A).

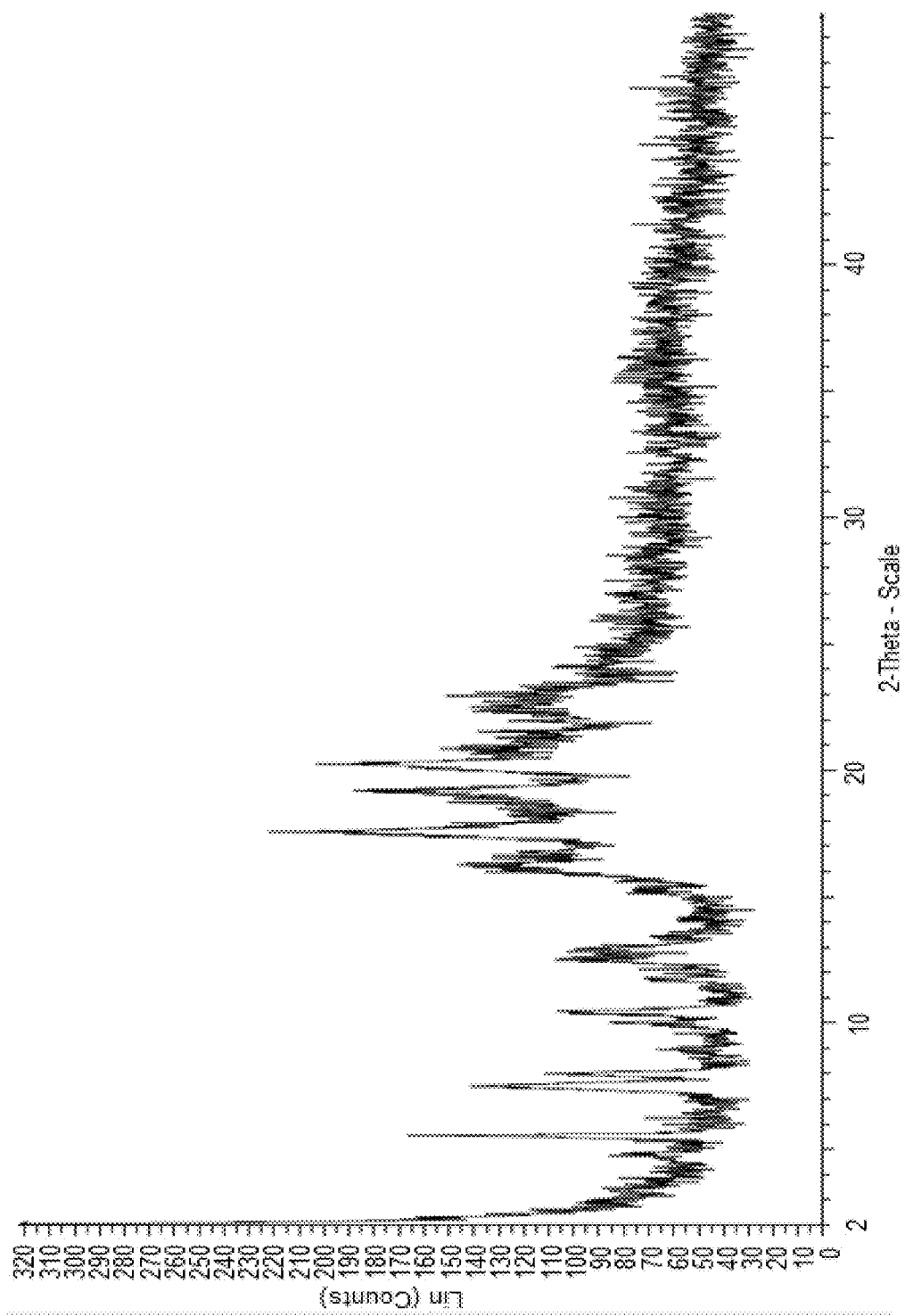
Figure 3. XRPD diffractogram of Sugammadex sodium obtained according to example 7 (compound I).

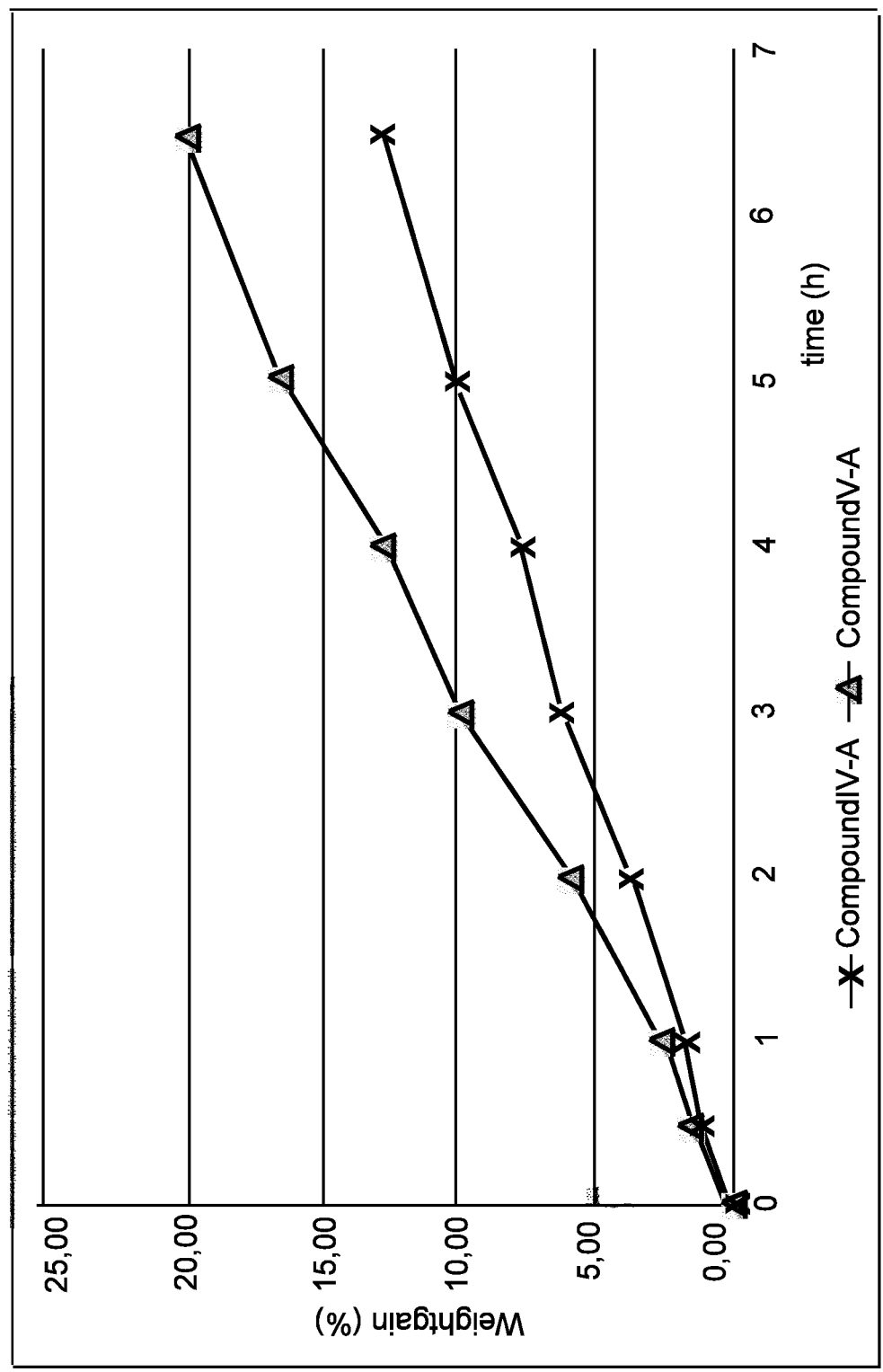
Figure 4. Percentage increase in weight of compound IV-A and compound V-A during the hydration process

PROCESS FOR THE SYNTHESIS OF A CYCLODEXTRIN DERIVATIVE

RELATED APPLICATIONS

This application is a § 371 national stage of PCI International Application No. PCT/EP2018/082598, filed Nov. 26, 2018, and claiming priority of European Patent Application No. EP17382802.1, filed. Nov. 27, 2017, the contents of each of which are hereby incorporated by reference into this application.

This invention relates to an improved process for the synthesis of 6-per-deoxy-6-per-(2-carboxyethyl)thio-γ-cyclodextrin or a salt thereof.

BACKGROUND OF THE INVENTION

Sugammadex is the international commonly accepted non-proprietary name (INN) for 6-per-deoxy-6-per-(2-carboxyethyl)thio-γ-cyclodextrin, and has an empirical formula of $C_{72}H_{112}O_{48}S_8$ and a molecular weight of 2002.18 g/mol.

The octa-sodium salt of Sugammadex (compound I), hereinafter referred to as Sugammadex sodium, is known to be therapeutically useful in the reversal of neuromuscular blockade induced by rocuronium or vecuronium. In Europe and the United States, Sugammadex sodium is marketed under the name Bridion™.

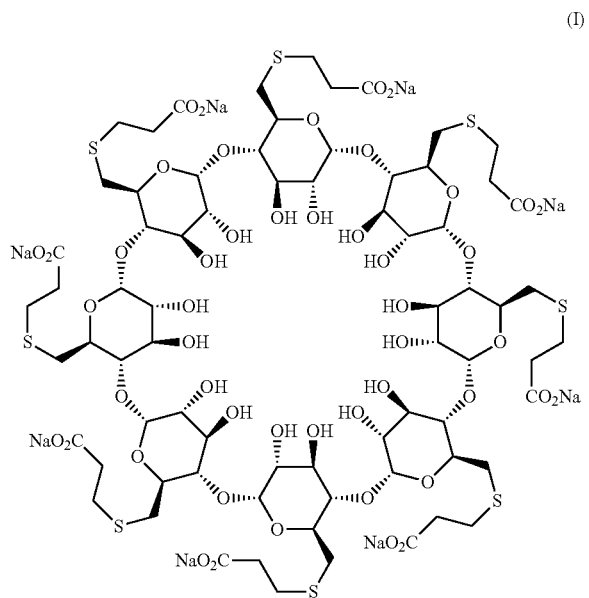

(I)

Sugammadex was first described in the U.S. Pat. No. RE44,733. Specifically, Example 4 of this patent discloses the reaction between 3-mercaptopropionic acid and 6-per-deoxy-6-per-iodo-γ-cyclodextrin in the presence of sodium hydride using dry N,N-dimethylformamide as solvent. After work-up, Sugammadex sodium was isolated with 43% yield. The preparation of 6-per-deoxy-6-per-iodo-γ-cyclodextrin is disclosed in Example 3 of this patent and involves the reaction of γ-cyclodextrin with iodine in presence of triphenylphosphine ($PPh_3$) and N,N-dimethylformamide. This process entails the formation of triphenylphosphine oxide as by-product. Removal of triphenylphosphine oxide is very difficult since it is easily soluble in most organic solvents and it is very hard to be separated from the final product, requiring repeated washing with water and acetone and leading to inconsistency in yield of final product.

Example 2 of U.S. Pat. No. 9,120,876 discloses the preparation of Sugammadex sodium by reacting 6-per-deoxy-6-per-chloro-γ-cyclodextrin with mercaptopropionic acid in the presence of sodium hydride in N,N-dimethylformamide as solvent. Chromatographic purification is described in order to obtain pure Sugammadex sodium (yield 60%). In this case, the preparation of the intermediate 6-per-deoxy-6-per-chloro-γ-cyclodextrin involves the use of phosphorus pentachloride with N,N-dimethylformamide (see Example 1). The use of phosphorus pentachloride is not desirable due to its toxicity.

These two processes involve the use of sodium hydride and chromatographic purification of Sugammadex sodium, both being not convenient in industrial operations. Sodium hydride is difficult to handle because it can ignite in air, especially upon contact with water to release hydrogen, which is also flammable. Thus, in practice, sodium hydride is dispensed as a dispersion in oil; usually as a mixture of 60% sodium hydride (w/w) in mineral oil. The use of this dispersion in oil complicates the working up of the process after completion of the reaction.

Example 2 of WO 2014/125501 A1 discloses the reaction of 6-per-deoxy-6-per-chloro-γ-cyclodextrin with 3-mercaptopropionic acid in the presence of sodium methoxide in N,N-dimethylformamide to yield crude Sugammadex sodium. This crude material is treated with activated carbon (20% w/w) and crystallized from a mixture of water and methanol, instead of being purified by chromatography. Despite sodium methoxide is easier to handle than sodium hydride, sodium methoxide is highly caustic and easily hydrolizable, so that its handling also requires special care and precautions. Moreover, use of large amounts of activated carbon is undesirable at industrial scale due to environmental reasons, since high amounts of saturated carbon are generated as residue.

Example 4 of WO 2016/194001 A1 discloses the reaction of 6-per-deoxy-6-per-chloro-γ-cyclodextrin with 3-mercaptopropionic acid in the presence of sodium amide in N,N-dimethylformamide to yield crude Sugammadex sodium. This crude is purified by a preparative HPLC method. Example 5 of WO 2016/194001 A1 discloses the reaction of 6-per-deoxy-6-per-chloro-γ-cyclodextrin with 3-mercaptopropionic acid in the presence of sodium amide in N,N-dimethylformamide to yield crude Sugammadex sodium. This crude material is treated with charcoal and crystallized from a mixture of water and methanol. Example 6 of WO 2016/194001 A1 discloses the reaction of 6-per-deoxy-6-per-chloro-γ-cyclodextrin with 3-mercaptopropionic acid in the presence of sodium hydroxide in N,N-dimethylformamide to yield crude Sugammadex sodium. This crude is treated with activated carbon in water and recrystallized from a mixture of methanol and water. In this case the intermediate 6-per-deoxy-6-per-chloro-γ-cyclodextrin is produced by reacting γ-cyclodextrin with phosgene (see Example 1) or oxalyl chloride (see Examples 2 and 3). WO 2016/194001 A1 teaches that following the processes disclosed in this patent application a preparative HPLC method is needed in order to obtain Sugammadex sodium of higher purities. This preparative HPLC method would be not applicable at industrial scale.

CN 106749771 A discloses several preparations of Sugammadex sodium wherein the intermediate 6-per-deoxy-6-per-bromo-γ-cyclodextrin reacts with 3-mercaptopropionic acid in the presence of a base such as sodium hydroxide, sodium tert-butoxide, sodium carbonate, sodium bicarbonate or sodium methoxide in N,N-dimethylformamide as solvent. Example 1 of CN 106749771 A discloses the preparation of Sugammadex sodium wherein the intermediate 6-per-deoxy-6-per-iodo-γ-cyclodextrin reacts with 3-mercaptopropionic acid in the presence of sodium hydroxide in N,N-dimethylformamide as solvent. The yields provided are from 62% to 83%. No purities are provided for the obtained crude Sugammadex sodium.

Examples 5-10 of WO 2017/084401 A1 disclose the preparation of Sugammadex sodium by reacting 6-per-deoxy-6-per-iodo-γ-cyclodextrin and 3-mercaptopropionic acid in the presence of sodium hydride using dry N,N-dimethylformamide as solvent. In Examples 11-21, the crude Sugammadex sodium is treated with high amounts, of at least 20% w/w, of charcoal and/or alumina and recrystallized from mixtures of water and methanol or ethanol.

Example 7 of WO 2017/089966 A1 discloses the preparation of Sugammadex sodium by reacting 6-per-deoxy-6-per-chloro-γ-cyclodextrin and 3-mercaptopropionic acid in the presence of sodium tert-butoxide using dimethylsulfoxide as solvent. Crude Sugammadex sodium is purified by ultrafiltration, which is a purification technique not convenient at industrial scale. Example 8 of WO 2017/089966 A1 discloses the preparation of Sugammadex sodium by reacting 6-per-deoxy-6-per-chloro-γ-cyclodextrin and 3-mercaptopropionic acid in the presence of sodium hydride using N,N-dimethylformamide as solvent. Crude Sugammadex sodium is purified over silica gel and size-exclusion chromatography using a Sephadex G-25 column. Both used purification methods are not convenient at industrial scale.

WO 2017/144734 A2 discloses the preparation of Sugammadex sodium by reacting 6-per-deoxy-6-per-bromo-γ-cyclodextrin and 3-mercaptopropionic acid in the presence of sodium hydroxide using dimethyl sulfoxide as solvent. Example 3 describes that the obtained Sugammadex sodium has a purity of 88.4% (HPLC).

WO 2017/163165 A1 discloses the preparation of Sugammadex sodium by reacting 6-per-deoxy-6-per-chloro-γ-cyclodextrin with the di-sodium salt of 3-mercaptopropionic acid in dimethylsulfoxide in the absence of a base (Examples 4-6). The di-sodium salt of 3-mercaptopropionic acid is prepared by reacting 3-mercaptopropionic acid with sodium hydroxide in tetrahydrofuran (Example 3). The resulting di-sodium salt of 3-mercaptopropionic is then isolated and further purified by slurrying in a mixture of tetrahydrofuran and N,N-dimethylformamide (Example 3). The obtained di-sodium salt of 3-mercaptopropionic acid has a purity of 97% by area % HPLC. WO 2017/163165 A1 states that the presence of excessive base during the substitution reaction between 6-per-deoxy-6-per-halo-γ-cyclodextrin and 3-mercaptopropionic acid produces unwanted impurities, which are very difficult to remove from the reaction mixture. Example 6 discloses the preparation of Sugammadex sodium with a purity of 98.0% area-% HPLC by reacting 6-per-deoxy-6-per-chloro-γ-cyclodextrin with the di-sodium salt of 3-mercaptopropionic acid. Crude Sugammadex sodium is treated with activated carbon in water. Final Sugammadex sodium is obtained by lyophilization. The yield is of about 40%.

WO 2018/136013 A1 discloses the preparation of Sugammadex sodium by reacting 6-per-deoxy-6-per-chloro-γ-cyclodextrin and 3-mercaptopropionic acid in the presence of sodium hydroxide (Examples 2-3), sodium tert-butoxide (Example 4) or sodium methoxide (Example 5). WO 2018/136013 A1 discloses a process for purifying the crude Sugammadex sodium which comprises the conversion of Sugammadex sodium into Sugammadex acid (Example 6) which is then purified by RP-18 silica gel or active carbon (Example 7). Sugammadex acid is then converted to purified Sugammadex sodium (Example 8). No purities are provided for the final purified Sugammadex sodium.

WO 2018/185784 A1 discloses the preparation of Sugammadex sodium by reacting 6-per-deoxy-6-per-chloro-γ-cyclodextrin and 3-mercaptopropionic acid in the presence of sodium methoxide in methanol using N,N-dimethylformamide as solvent (Example 3). WO 2018/185784 A1 also discloses a multi-step process of purification of crude Sugammadex sodium which comprises the conversion of Sugammadex sodium into Sugammadex acid, which is purified by preparative HPLC, and also the lyophilization of Sugammadex sodium to obtain the final Sugammadex sodium. Preparative HPLC as well as lyophilization are not efficient processes to be performed at industrial scale.

None of the processes disclosed in the prior art involves the preparation and isolation of the mono-salt of 3-mercaptopropionic acid with an alkaline metal.

The Public Assessment Report for Bridion™ of the European Medicines Agency (EMA) states that the synthesis of Sugammadex is complicated by the fact that it requires the complete conversion of eight identical functional groups per molecule, giving rise to high level of impurities which are structurally related to γ-cyclodextrin and therefore, very difficult to remove.

Concretely, the Chemistry Review Data Sheet of the US Food and Drug Administration (FDA) states that Bridion™, may contain up to 7% of the mono OH-derivative of Sugammadex sodium, referred to as Org48302.

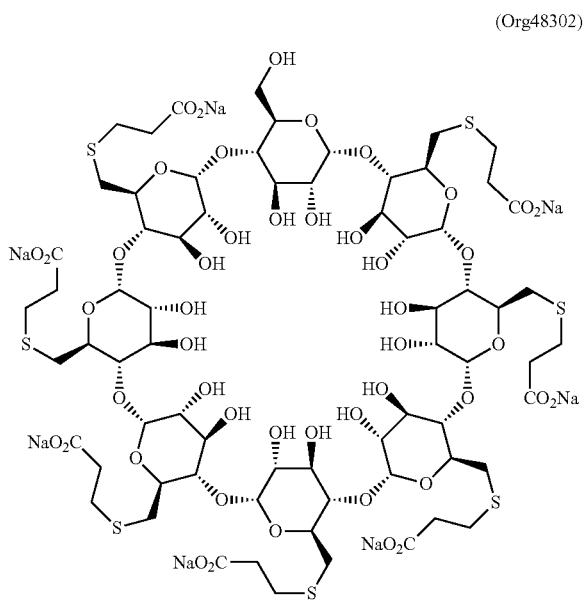

(Org48302)

Therefore, there is the need of providing improved and industrially applicable processes for preparing Sugammadex or its pharmaceutically acceptable salts, preferably Sugammadex sodium, with high yields and high purity.

BRIEF DESCRIPTION OF THE DRAWINGS

FIG. 1 depicts the X-Ray Powder Diffractogram (XRPD) of 6-per-deoxy-6-per-chloro-γ-cyclodextrin obtained according to example 1 (compound II-A).

FIG. 2 depicts the X-Ray Powder Diffractogram (XRPD) of mono-sodium salt of 3-mercaptopropionic acid obtained according to example 4 (compound IV-A).

FIG. 3 depicts the X-Ray Powder Diffractogram (XRPD) of Sugammadex sodium obtained according to example 7 (compound I).

FIG. 4 depicts the percentage increase in weight of the mono-sodium salt of 3-mercaptopropionic acid (compound IV-A) and the di sodium salt of 3-mercaptopropionic acid (compound V-A), during the hydration process at 80±2% relative humidity (RH) and at 25° C. as happens immediately after drying.

BRIEF SUMMARY OF THE INVENTION

It is an object of the present invention to provide an improved process for preparing Sugammadex or its pharmaceutically acceptable salts, preferably Sugammadex sodium, on a large, commercial scale which overcomes the drawbacks of the processes disclosed in the prior art and allows to obtain Sugammadex or its pharmaceutically acceptable salts, preferably Sugammadex sodium, with higher purity and higher yield.

The process of the present invention provide Sugammadex or its pharmaceutically acceptable salts, preferably Sugammadex sodium, of high purity with higher yields without the need of performing purification processes which are not convenient at industrial scale.

DETAILED DESCRIPTION OF THE INVENTION

A first aspect of the present invention provides a process for the preparation of Sugammadex or its salts, preferably Sugammadex sodium, which comprises:

a) reacting 3-mercaptopropionic acid of formula (III)

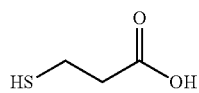

(III)

with an ionic base to obtain the mono-salt of formula (IV),

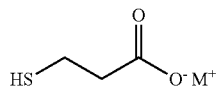

(IV)

wherein M is an alkaline metal;

b) isolating the mono-salt of formula (IV);

c) reacting the mono-salt of formula (IV) with the compound of formula (II) or a hydrate or solvate thereof, in the presence of an ionic base,

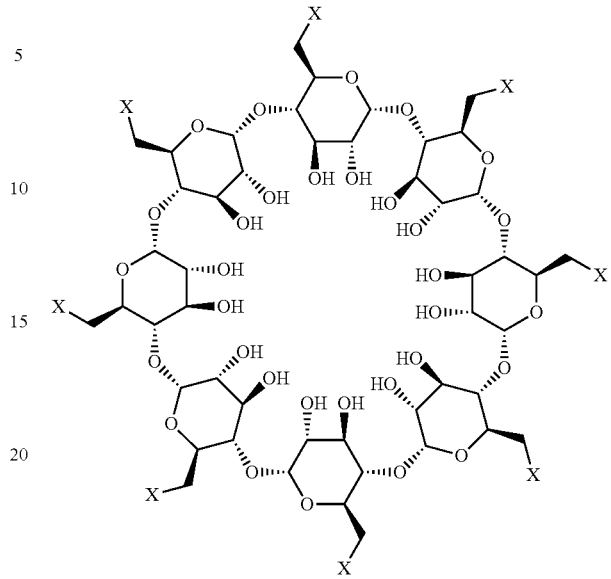

(II)

wherein X is Cl, Br, I, or $OSO_2R$, wherein R is $C_1$-$C_4$ alkyl, optionally substituted by F, Cl, Br or I; phenyl or $C_1$-$C_4$ alkyl-phenyl.

The authors of the present invention have found that using the isolated mono-salt of formula (IV), Sugammadex or its salts, preferably Sugammadex sodium, is obtained with better yields and higher purity. This process leads to Sugammadex or its salts, preferably to Sugammadex sodium, of high purity with higher yields and without the need of performing purification processes which are not convenient at industrial scale.

The reaction between 3-mercaptopropionic acid of formula (III) and the ionic base of step a) preferably takes place in an organic solvent. The organic solvent used may be selected from the group comprising of polar aprotic solvents such as dimethylsulfoxide, N,N-dimethylacetamide, N,N-dimethylformamide and the like; alcohol solvents such as methanol, ethanol, n-propanol, isopropanol, n-butanol and the like; hydrocarbon solvents such as benzene, toluene, xylene, heptane, hexane and cyclohexane; ether solvents such as di-tert-butylether, diethylether, diisopropyl ether, 1,4-dioxane, methyl tert-butylether, ethyl tert-butyl ether, tetrahydrofuran and dimethoxyethane and mixtures thereof. Preferably, the reaction between 3-mercaptopropionic acid of formula (III) and the ionic base of step a) takes place in alcohol solvents such as methanol, ethanol, n-propanol, isopropanol, n-butanol or mixtures thereof, more preferably in isopropanol.

The term ionic base as used herein refers to an ionic compound which comprises an alkaline metal cation and a suitable basic anion.

The basic anion used in step a) of the process of the present invention, can be selected from the list comprising amide, hydride, alkoxide, hydroxide and mixtures thereof.

Preferably, the ionic base used in step a) of the process of the present invention, is an alkaline ionic base such as sodium, potassium, lithium or cesium ionic base, more preferably sodium ionic base.

The sodium ionic base, used in step a) of the process of the present invention, is preferably selected from the group comprising sodium amide, sodium hydride, sodium alkoxide, sodium hydroxide and/or mixtures thereof. More preferably, the ionic base used in step a) is sodium hydroxide. Sodium hydroxide used in step a) can be in solid form or in solution. Preferably, sodium hydroxide is used in solid form.

The mono-salt of formula (IV) of the present invention also includes any hydrate or solvate thereof. Preferably, the mono-salt of formula (IV) of the present invention is a non-hydrated form.

The mono-salt of formula (IV) is preferably the mono-sodium salt of 3-mercaptopropionic acid, compound of formula (IV-A).

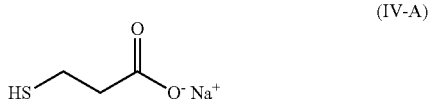

(IV-A)

The authors of the present invention have found that the mono-salt of formula (IV), preferably the mono-sodium salt of formula (IV-A), once it has been isolated, can be directly used in the preparation of Sugammadex sodium without the need of any further purification process.

The use of isolated salts of 3-mercaptopropionic acid allows the starting material 3-mercaptopropionic acid to be purified before its use for preparing Sugammadex or its salts, preferably Sugammadex sodium.

The authors of the present invention have surprisingly found that the isolation of the mono-salt of formula (IV), preferably the mono-sodium salt of formula (IV-A), involves a better purification of the 3-mercaptopropionic acid than the isolation of the corresponding di-salt (formula V).

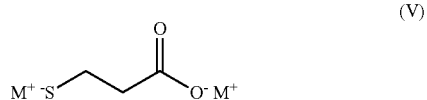

(V)

wherein M is an alkaline metal.

The authors of the present invention have found that the mono-sodium salt of formula (IV-A) is less hygroscopic and more stable than the di-sodium salt of formula (V-A), so that the mono-sodium salt of formula (IV-A) is easier to handle than the corresponding di-sodium salt of formula (V-A). For example, the mono-sodium salt of formula (IV-A) can be stored for longer times without the need of special storage conditions before being used for preparing Sugammadex sodium, whereas the di-sodium salt of formula (V-A) would require more care in view of its higher hygroscopicity and less stability.

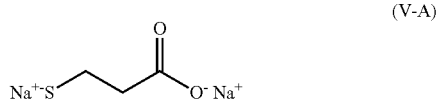

(V-A)

A very high hygroscopicity can lead to deliquescence which involves that the material absorbs sufficient water to form an aqueous solution, which is very undesirable for products which have to be handled and/or stored before their use. At the same time the more hygroscopic a material is, the harder it is to keep it dry before its use.

Furthermore, the use of a less hygroscopic salt, such as the mono-sodium salt of formula (IV-A), reduces the presence of undesired water in the reaction between the mono-sodium salt of formula (IV-A) and the compound of formula (II) or a hydrate or solvate thereof. The presence of an excess of water in this reaction is detrimental for the quality of the final Sugammadex or its salts, preferably Sugammadex sodium, because the presence of water can yield to different hydrolysis impurities such as Org48302.

The ionic base, preferably the sodium ionic base, more preferably sodium hydroxide in solid form, in step a) of the process of the present invention, is preferably used in a molar ratio between 0.5 and 1, more preferably in a molar ratio between 0.9 and 1.0, even more preferably in a molar ratio of 0.95, with respect to 3-mercaptopropionic acid of formula (III).

Preferably, the reaction between 3-mercaptopropionic acid of formula (III) and the ionic base, preferably sodium ionic base, more preferably sodium hydroxide in solid form, of step a) takes place at a temperature from 0° C. to 50° C.; more preferably from 20° C. to 30° C., even more preferably from 20° C. to 25° C.

The isolation of the mono-salt of formula (IV), preferably the mono-sodium salt of formula (IV-A), preferably takes place by filtration from the reaction mixture. Preferably a hydrocarbon solvent, more preferably heptane, is added before the filtration of the reaction mixture to isolate the mono-salt of formula (IV), preferably the mono-sodium salt of formula (IV-A).

Mono-salt of formula (IV), preferably the mono-sodium salt of formula (IV-A), of the present invention, is more than 97% (% area) pure when analyzed by a HPLC method for chromatographic purity, preferably more than 97.5% (% area) pure when analyzed by a HPLC method for chromatographic purity, more preferably more than 98.0% (% area) pure when analyzed by a HPLC method for chromatographic purity, even more preferably more than 98.5% (% area) pure when analyzed by a HPLC method for chromatographic purity.

In step c), the reaction between the mono-salt of formula (IV), preferably the mono-sodium salt of formula (IV-A), and the compound of formula (II) or a hydrate or solvate thereof, in the presence of an ionic base, preferably takes place in an organic solvent. The organic solvent used may be selected from the group comprising of polar aprotic solvents such as dimethylsulfoxide, N,N-dimethylacetamide, N,N-dimethylformamide and the like; alcohol solvents such as methanol, ethanol, n-propanol, isopropanol, n-butanol and the like; hydrocarbon solvents such as benzene, toluene, xylene, heptane, hexane and cyclohexane; ether solvents such as di-tert-butylether, diethylether, diisopropyl ether, 1,4-dioxane, methyl tert-butylether, ethyl tert-butyl ether, tetrahydrofuran and dimethoxyethane and mixtures thereof. Preferably, in step c), the reaction between the mono-salt of formula (IV), preferably the mono-sodium salt of formula (IV-A), and the compound of formula (II) or a hydrate or solvate thereof, in the presence of an ionic base, takes place in a mixture of polar aprotic solvents such as dimethylsulfoxide, N,N-dimethylacetamide, N,N-dimethylformamide and the like and alcohol solvents such as methanol, ethanol, n-propanol, isopropanol, n-butanol and the like, more preferably in a mixture of N,N-dimethylformamide and methanol.

The basic anion used in step c) of the process of the present invention, can be selected from the list comprising amide, hydride, alkoxide, hydroxide and mixtures thereof.

Preferably, the ionic base used in step c) of the process of the present invention, is an alkaline ionic base such as sodium, potassium, lithium or cesium ionic base, more preferably sodium ionic base.

The sodium ionic base used in step c), is preferably selected from the group comprising sodium amide, sodium hydride, sodium alkoxide, sodium hydroxide and/or mixtures thereof. More preferably, the ionic base used in step c) is sodium hydroxide. Sodium hydroxide used in step c) can be in solid form or in solution. Preferably, sodium hydroxide is used in solid form as it avoids the presence of an excess of water in the reaction media.

The ionic base, preferably the sodium ionic base, more preferably sodium hydroxide in solid form, in step c) of the process of the present invention, is preferably used in a molar ratio between 0.5 and 1, preferably in a molar ratio of 1 with respect to the mono-salt of formula (IV), preferably the mono-sodium salt of formula (IV-A).

In step c), the reaction between the mono-salt of formula (IV), preferably the mono-sodium salt of formula (IV-A), and the compound of formula (II) or a hydrate or solvate thereof, in the presence of an ionic base, preferably sodium ionic base, more preferably sodium hydroxide in solid form, takes place at a temperature between 20° C. and 160° C., preferably between 60° C. and 130° C., more preferably between 90° C. and 120° C., even more preferably between 95° C. and 110° C.

In step c), the reaction between the mono-salt of formula (IV), preferably the mono-sodium salt of formula (IV-A), and the compound of formula (II) or a hydrate or solvate thereof, in the presence of an ionic base, preferably sodium ionic base, more preferably sodium hydroxide in solid form, takes place for 4 to 8 hours, preferably about 6 hours, at 95° C. to 100° C., followed by 8 to 12 hours, preferably about 10 hours, at 105° C. to 110° C.

Preferably, the whole process of the present invention, that is step a), step b), and step c), takes place in the presence of inert atmosphere. The inert atmosphere can be provided by providing vacuum or an inert gas. The inert gas can be nitrogen or argon, preferably nitrogen.

The compound of formula (II) or a hydrate or solvate thereof is preferably selected from the group consisting of 6-per-deoxy-6-per-chloro-γ-cyclodextrin, 6-per-deoxy-6-per-bromo-γ-cyclodextrin and 6-per-deoxy-6-per-iodo-γ-cyclodextrin or a hydrate or solvate thereof. More preferably the compound of formula (II) or a hydrate or solvate thereof is 6-per-deoxy-6-per-chloro-γ-cyclodextrin, compound of formula (II-A).

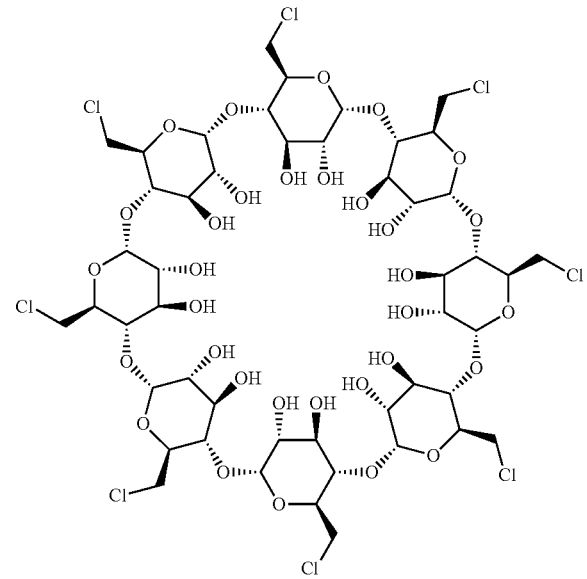

(II-A)

or a hydrate or solvate thereof.

In a preferred embodiment, the compound of formula (II) or a hydrate or solvate thereof, wherein X is Cl, Br, I, is preferably prepared by a process comprising the following steps:

a) reacting a sulfonyl halide with a tertiary amide compound to form a Vilsmeier reagent; and b) reacting the Vilsmeier reagent with γ-cyclodextrin.

The γ-cyclodextrin is commercially available or can be synthesized by the teachings of the prior art.

γ-cyclodextrin used in the processes of the present invention is preferably dry γ-cyclodextrin, more preferably comprising less than 5% wt. of water, more preferably less than 2% wt. of water, more preferably less than 1% wt. of water and most preferably less than 0.5% wt. of water. For example, γ-cyclodextrin can be dried in a vacuum oven, optionally heating.

In a particular preferred embodiment of the present invention, X is Cl and the sulfonyl halide is a sulfonyl chloride. Preferably, the sulfonyl chloride of step a) used for preparing the compound of formula (II-A) or a hydrate or solvate thereof, is selected from the group comprising methanesulfonyl chloride, ethanesulfonyl chloride, allylsulfonyl chloride, 1-propanesulfonyl chloride, benzenesulfonyl chloride, toluenesulfonyl chloride, 4-ethylbenzenesulfonyl chloride, m-xylene-4-sulfonyl chloride, p-xylene-2-sulfonyl chloride, 4-dodecylbenzenesulfonyl chloride, 2-mesitylenesulfonyl chloride, 2,3,5-trichlorobenzenesulfonyl chloride, 2,4-dinitrobenzenesulfonyl chloride, 4-bromobenzenesulfonyl chloride, 4-chlorobenzenesulfonyl chloride, heptadecafluorooctanesulfonyl chloride, 1-naphthalenesulfonyl chloride, 2-naphthalenesulfonyl chloride, 1,3,6-naphthalenetrisulfonyl chloride, 2,6-naphthalenedisulfonyl chloride, 1,5-naphthalenedisulfonyl chloride, 1-pyrenesulfonyl chloride, and/or mixtures thereof. More preferably the sulfonyl chloride is methanesulfonyl chloride.

In another preferred embodiment of the present invention, the tertiary amide compound of step a) is selected from the group comprising N,N-dimethylformamide, N,N-dimethylacetamide, N-methyl-2-pyrrolidone, and/or mixtures thereof. More preferably the tertiary amide compound is N,N-dimethylformamide.

The Vilsmeier reagent which is formed in the process for preparing the compound of formula (II) or a hydrate or solvate thereof, wherein X is Cl, Br, I, of the present invention corresponds to a compound of formula (VI),

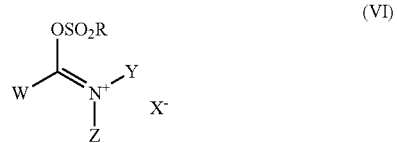

(VI)

wherein X is Cl, Br or I as hereinbefore disclosed, R corresponds to the alkyl or aryl group of the sulfonyl halide reagent ($RSO_2X$), and W, Y and Z correspond to the different substituents of the tertiary amide compound (WC(O)NYZ). Preferably X is chlorine, W is hydrogen, and R, Y and Z are methyl, and consequently the compound of formula (VI) is N-methyl-N-{[(methylsulfonyl)oxy]methylidene}methanaminium chloride (compound VI-A).

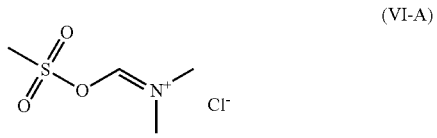

(VI-A)

The Vilsmeier reagent which is formed can be isolated or can be directly reacted with γ-cyclodextrin without performing any isolation step.

In a preferred embodiment of the present invention, the sulfonyl halide is added to a mixture comprising γ-cyclodextrin and a tertiary amide compound.

In a preferred embodiment of the present invention, methanesulfonyl chloride is added over a solution of γ-cyclodextrin comprising N,N-dimethylformamide which also acts as a solvent.

Optionally, the preparation of the compound of formula (II) or a hydrate or solvate thereof, wherein X is Cl, Br, I, is carried out in the presence of a solvent selected from the group comprising acetone, anisole, butyl acetate, tert-butyl methyl ether, chlorobenzene, chloroform, cyclohexane, cumene, 1,2-dichloroethane, 1,2-dichloroethene, dichloromethane, 1,1-diethoxypropane, 1,2-dimethoxyethane, 1,1-dimethoxymethane, 2,2-dimethoxypropane, dimethylsulfoxide, 1,4-dioxane, ethyl acetate, ethyl ether, ethyl formate, heptane, hexane, isobutyl acetate, isopropyl acetate, isooctane, isopropyl ether, methyl acetate, methylbutyl ketone, methylcyclohexane, methyl ethyl ketone, methyl isobutyl ketone, methyl isopropyl ketone, nitromethane, pentane, petroleum ether, propyl acetate, pyridine, sulfolane, tetrahydrofuran, 2-methyltetrahydrofuran, tetralin, toluene, 1,1,2-trichloroethene, xylene, and mixtures thereof. N,N-dimethylformamide, N,N-dimethylacetamide and N-methyl-2-pyrrolidone which are tertiary amides that may be used in step a) may also act as solvents in which case there is no need to employ any additional solvent.

Preferably, the reaction between the Vilsmeier reagent and γ-cyclodextrin of step b) is carried out in the presence of a halide salt. The halide salt can be any inorganic salt or any organic salt comprising a halide anion. Preferably the halide salt is a chloride salt. More particularly, the chloride salt can be selected from the group comprising lithium chloride, sodium chloride, potassium chloride, cesium chloride, magnesium chloride, calcium chloride, a quaternary ammonium chloride, and/or mixtures thereof. In a most preferred embodiment, the chloride salt is lithium chloride.

In another preferred embodiment of the present invention, the reaction between the sulfonyl halide and the tertiary amide compound to form the Vilsmeier reagent is carried out at a temperature between 50° C. to 80° C., preferably at a temperature between 60° C. to 70° C.

In a preferred embodiment of the present invention, the reaction between methanesulfonyl chloride and N,N-dimethylformamide to give N-methyl-N-{[(methylsulfonyl)oxy]methylidene}methanaminium chloride (compound VI-A) is carried out at a temperature between 50° C. to 80° C., preferably at a temperature between 60° C. to 70° C.

In another preferred embodiment of the present invention, the reaction between the Vilsmeier reagent and γ-cyclodextrin is carried out at a temperature between 50° C. to 80° C., preferably at a temperature between 60° C. to 70° C.

In a particularly preferred embodiment of the present invention, the reaction between N-methyl-N-{[(methylsulfonyl)oxy]methylidene}methanaminium chloride (compound VI-A) and γ-cyclodextrin is carried out at a temperature between 50° C. to 80° C., preferably at a temperature between 60° C. to 70° C.

Another aspect of the present invention provides a process for preparing the compound of formula (II) or a hydrate or solvate thereof,

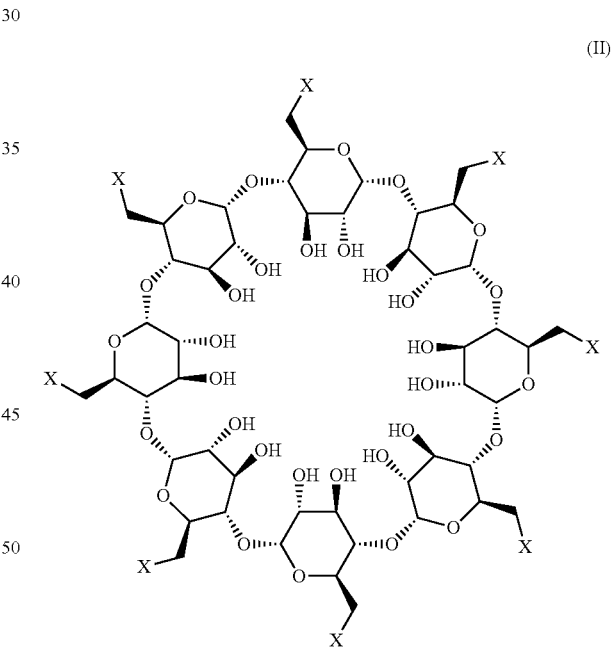

(II)

wherein X is Cl, Br, I, comprising
a) reacting a sulfonyl halide with a tertiary amide compound to form a Vilsmeier reagent; and
b) reacting the Vilsmeier reagent with γ-cyclodextrin
wherein the step b) is carried out in the presence of a halide salt.

The Vilsmeier reagent which is formed can be isolated or can be directly reacted with γ-cyclodextrin without performing any isolation step.

In a preferred embodiment of the present invention, the sulfonyl halide is added to a mixture comprising γ-cyclodextrin, a tertiary amide compound and a halide salt.

In a particular preferred embodiment, X is Cl, the sulfonyl halide is a sulfonyl chloride and the halide salt is a chloride salt and consequently 6-per-deoxy-6-per-chloro-γ-cyclodextrin, compound of formula (II-A) or a hydrate or solvate thereof, is obtained.

Preferably, the sulfonyl chloride of step a) used for preparing the compound of formula (II-A) or a hydrate or solvate thereof, is selected from the group comprising methanesulfonyl chloride, ethanesulfonyl chloride, allylsulfonyl chloride, 1-propanesulfonyl chloride, benzenesulfonyl chloride, toluenesulfonyl chloride, 4-ethylbenzenesulfonyl chloride, m-xylene-4-sulfonyl chloride, p-xylene-2-sulfonyl chloride, 4-dodecylbenzenesulfonyl chloride, 2-mesitylenesulfonyl chloride, 2,3,5-trichlorobenzenesulfonyl chloride, 2,4-dinitrobenzenesulfonyl chloride, 4-bromobenzenesulfonyl chloride, 4-chlorobenzenesulfonyl chloride, heptadecafluorooctanesulfonyl chloride, 1-naphthalenesulfonyl chloride, 2-naphthalenesulfonyl chloride, 1,3,6-naphthalenetrisulfonyl chloride, 2,6-naphthalenedisulfonyl chloride, 1,5-naphthalenedisulfonyl chloride, 1-pyrenesulfonyl chloride, and/or mixtures thereof. More preferably the sulfonyl chloride is methanesulfonyl chloride.

Preferably, the chloride salt of step b) for preparing the compound of formula (II-A) or a hydrate or solvate thereof is selected from the group comprising lithium chloride, sodium chloride, potassium chloride, cesium chloride, magnesium chloride, calcium chloride, a quaternary ammonium chloride, and/or mixtures thereof. More preferably the chloride salt is lithium chloride.

Bull. Soc. Chim. Fr. 1995, 132, 857-866 discloses the preparation of 6-per-deoxy-6-per-chloro-γ-cyclodextrin by reaction of γ-cyclodextrin with methanesulfonyl chloride in dry N,N-dimethylformamide at 65° C. (compound 2γ) with 97% yield. Purity of the obtained 6-per-deoxy-6-per-chloro-γ-cyclodextrin is not reported.

The authors of the present invention have found that both yield and purity of the compound of formula (II), wherein X is Cl, Br, I, preferably compound of formula (II-A), or a hydrate or solvate thereof are higher when the reaction between the Vilsmeier reagent and γ-cyclodextrin of step b) is carried out in the presence of a halide salt, preferably a chloride salt.

In a preferred embodiment of the present invention, methanesulfonyl chloride is added over a solution of γ-cyclodextrin and lithium chloride in N,N-dimethylformamide.

The compounds of formula (II), preferably compound of formula (II-A), or a hydrate or solvate thereof produced according to the process of the present invention are of higher purity.

Preferably, the tertiary amide compound of step a) for preparing the compound of formula (II), wherein X is Cl, Br, I, or a hydrate or solvate thereof, is selected from the group comprising N,N-dimethylformamide, N,N-dimethylacetamide, N-methyl-2-pyrrolidone, and/or mixtures thereof. More preferably the tertiary amide compound is N,N-dimethylformamide.

In another embodiment of the present invention, the compound of formula (II) or a hydrate or solvate thereof, preferably 6-per-deoxy-6-per-chloro-γ-cyclodextrin, compound of formula (II-A) or a hydrate or solvate thereof, can be purified by recrystallization or slurrying in water, organic solvents or mixtures thereof. The organic solvents used for the purification of the compound of formula (II) or a hydrate or solvate thereof, preferably 6-per-deoxy-6-per-chloro-γ-cyclodextrin, compound of formula (II-A) or a hydrate or solvate thereof, are preferably polar aprotic solvents such as dimethylsulfoxide, N,N-dimethylacetamide, N,N-dimethylformamide and the like; alcohol solvents such as methanol, ethanol, n-propanol, isopropanol, n-butanol and the like; ketone solvents such as acetone, methyl ethyl ketone and methyl isobutyl ketone and mixtures thereof. Preferably, the compound of formula (II) or a hydrate or solvate thereof, preferably 6-per-deoxy-6-per-chloro-γ-cyclodextrin, compound of formula (II-A) or a hydrate or solvate thereof, can be purified by recrystallization or slurrying in a mixture of solvents comprising N,N-dimethylformamide, acetone and water, or in a mixture of solvents comprising methanol and water, for example in a mixture of methanol, acetone and water. In a preferred embodiment, the recrystallization or slurrying of the compound of formula (II) or a hydrate or solvate thereof, preferably 6-per-deoxy-6-per-chloro-γ-cyclodextrin, compound of formula (II-A) or a hydrate or solvate thereof, is performed at a temperature between −30° C. to 80° C., preferably between −20° C. to 60° C.

Additionally, the compound of formula (II) or a hydrate or solvate thereof, preferably 6-per-deoxy-6-per-chloro-γ-cyclodextrin, compound of formula (II-A) or a hydrate or solvate thereof, can be purified by recrystallization or slurrying in a mixture comprising water and organic solvents as hereinbefore described, wherein the pH of the mixture is adjusted between 0.5 to 13.5, preferably between 8.0 to 13.0, using aqueous sodium hydroxide or hydrochloric acid.

Additionally, the compound of formula (II) or a hydrate or solvate thereof, preferably 6-per-deoxy-6-per-chloro-γ-cyclodextrin, compound of formula (II-A) or a hydrate or solvate thereof, can be purified by recrystallization or slurrying in a mixture comprising water and organic solvents as hereinbefore described, wherein the pH of the mixture is adjusted between 0.5 to 13.5, preferably between 0.5 to 1.5, using aqueous sodium hydroxide or hydrochloric acid.

Another aspect of the present invention provides compounds of formula (II) or a hydrate or solvate thereof, wherein X is Cl, Br, I, preferably 6-per-deoxy-6-per-chloro-γ-cyclodextrin (II-A) or a hydrate or solvate thereof, obtained following the process disclosed in the present invention.

Another aspect of the present invention provides a process for preparing Sugammadex or its salts, preferably Sugammadex sodium, from the compounds of formula (II) or a hydrate or solvate thereof, wherein X is Cl, Br, I, preferably 6-per-deoxy-6-per-chloro-γ-cyclodextrin (II-A) or a hydrate or solvate thereof, produced according to the process disclosed in the present invention.

Advantageously, the obtained Sugammadex or its salts, preferably Sugammadex sodium, according to any of the processes of the present invention, can be purified by recrystallization or slurrying in water, organic solvents or mixtures thereof. The organic solvents used for the purification of Sugammadex or its salts, preferably Sugammadex sodium, are preferably polar aprotic solvents such as dimethylsulfoxide, N,N-dimethylacetamide, N,N-dimethylformamide and the like; alcohol solvents such as methanol, ethanol, n-propanol, isopropanol, n-butanol and the like; hydrocarbon solvents such as benzene, toluene, xylene, heptane, hexane and cyclohexane; ether solvents such as di-tert-butylether, diethylether, diisopropyl ether, 1,4-dioxane, methyl tert-butylether, ethyl tert-butyl ether, tetrahydrofuran and dimethoxyethane and mixtures thereof. Preferably, Sugammadex or its salts, preferably Sugammadex sodium, is purified by recrystallization or slurrying in a mixture of water and an alcohol solvent, more preferably by recrystallization or slurrying in a mixture of water and methanol and/or ethanol, optionally also using heptane.

Optionally Sugammadex or its salts, preferably Sugammadex sodium, obtained according to any of the processes of the present invention can be further purified by reacting the obtained Sugammadex or its salts, preferably Sugammadex sodium, with acrylic acid or a salt or an ester thereof, preferably with methyl acrylate, in order to reduce the amount of Imp1200. When Sugammadex or its salts, preferably Sugammadex sodium, which contains Imp1200, is reacted with an ester of acrylic acid such as methyl acrylate, the resulting Sugammadex monoester derivative is further hydrolyzed, preferably under basic conditions, in order to recover Sugammadex or its salts, preferably Sugammadex sodium.

than 96.5% (% area) pure when analyzed by a HPLC method for chromatographic purity, more preferably more than 98.0% (% area) pure when analyzed by a HPLC method for chromatographic purity and even more preferably more than 99.0%(% area) pure when analyzed by a HPLC method for chromatographic purity.

The % area of a specific compound as used in the present invention is calculated as follows: the area of the specific compound of the HPLC chromatogram obtained as defined in the HPLC method for chromatographic purity of the present invention is divided by the sum of the areas of all the peaks of the HPLC chromatogram obtained as defined in the

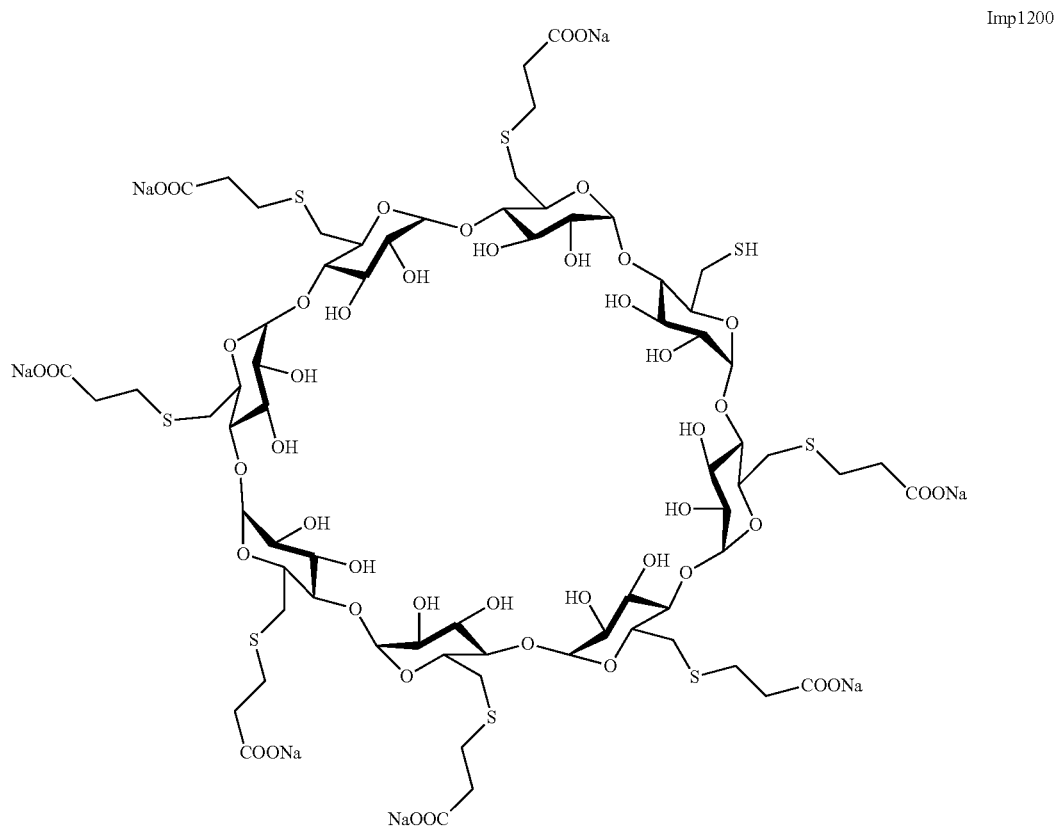

Imp1200

The process of the present invention leads to a Sugammadex or its salts, preferably Sugammadex sodium, of high purity without the need of using purification techniques not convenient at industrial scale.

The term "purification techniques not convenient at industrial scale" as herein used means all the purification techniques different from common operations performed at industrial scale such as filtration, extraction, crystallization, re-crystallization or slurry. Purification techniques such chromatography, adsorption, dialysis or ultrafiltration would be included within the term "purification techniques not convenient at industrial scale".

Another aspect of the present invention provides Sugammadex or its salts, preferably Sugammadex sodium of high purity.

The term "of high purity" as used herein refers to Sugammadex or its salts, preferably Sugammadex sodium, which is more than 95% (% area) pure when analyzed by a HPLC method for chromatographic purity, preferably more HPLC method for chromatographic purity of the present invention. The value obtained is then multiplied by 100.

The HPLC method for chromatographic purity according to the present invention comprises any HPLC method used to determine the purity of Sugammadex or its salts, preferably of Sugammadex sodium. Preferably, the HPLC method for chromatographic purity comprises the HPLC method for chromatographic purity used in the present invention.

The process according to the present invention leads to Sugammadex or its salts, preferably Sugammadex sodium, which is more than 95% (% area) pure when analyzed by a HPLC method for chromatographic purity, preferably more than 96.5% (% area) pure when analyzed by a HPLC method for chromatographic purity, more preferably more than 98.0% (% area) pure when analyzed by a HPLC method for chromatographic purity, even more preferably more than 99.0% (% area) pure when analyzed by a HPLC method for chromatographic purity.

Another aspect of the present invention provides Sugammadex or its salts, preferably Sugammadex sodium, which is more than 95% (% area) pure when analyzed by a HPLC method for chromatographic purity, preferably more than 96.5% (% area) pure when analyzed by a HPLC method for chromatographic purity, more preferably more than 98.0% (% area) pure when analyzed by a HPLC method for chromatographic purity, even more preferably more than 99.0% (% area) pure when analyzed by a HPLC method for chromatographic purity.

Another aspect of the present invention provides mono-sodium salt of 3-mercaptopropionic acid of formula (IV-A). In particular, the present invention provides isolated mono-sodium salt of 3-mercaptopropionic acid of formula (IV-A).

Preferably, the isolated mono-sodium salt of 3-mercaptopropionic acid of formula (IV-A) is characterized by having X-ray powder diffraction (XRPD) pattern comprising peaks at 6.1 and 24.9±0.2° 2-theta (2θ), preferably comprising peaks at 6.1, 6.6, 24.9, 27.6, 30.2, 30.7 and 37.7±0.2° 2-theta (2θ), and more preferably comprising peaks at 6.1, 6.6, 9.0, 12.3, 17.9, 18.6, 21.1, 22.8, 24.9, 25.2, 27.6, 28.2, 30.2, 30.7, 37.7 and 46.2±0.2° 2-theta (2θ). In a further aspect of the present invention, the mono-sodium salt of 3-mercaptopropionic acid is characterized by having a X-ray powder diffraction (XRPD) pattern substantially equivalent to the diffraction plot depicted in FIG. 2.

Another aspect of the present invention provides the use of the mono-sodium salt of 3-mercaptopropionic acid of formula (IV-A) according to the present invention for preparing Sugammadex or its salts, preferably Sugammadex sodium.

Sugammadex or its salts, preferably Sugammadex sodium, obtained according to the process of the present invention are used for the preparation of a medicament for the reversal of drug-induced neuromuscular block.

Sugammadex or its salts, preferably Sugammadex sodium, obtained according to the process of the present invention are preferably administered parenterally. The injection route can be intravenous, subcutaneous, intradermal, intramuscular, or intra-arterial. The intravenous route is the preferred one. The exact dose to be used will necessarily be dependent upon the needs of the individual subject to whom the medicament is being administered, the degree of muscular activity to be restored and the judgement of the anesthetist/critical-care specialist.

Another aspect of the present invention involves pharmaceutical compositions comprising the Sugammadex or its salts, preferably Sugammadex sodium, obtained according to the process of the present invention. Preferably the pharmaceutical composition according to the present invention can be applied in the form of a solution, e.g. for use as an injection preparation.

Preferably the pharmaceutical compositions according to the present invention, preferably pharmaceutical compositions for use as an injection preparation, are prepared by mixing Sugammadex or its salts, preferably Sugammadex sodium, with water for injection. Preferably, the water for injection contains less than 100 ppm of oxygen, preferably less than 10 ppm of oxygen, more preferably less than 1 ppm of oxygen. The water for injection which contains less than 100 ppm of oxygen, preferably less than 10 ppm of oxygen, more preferably less than 1 ppm of oxygen, can be prepared by bubbling the water with an inert gas. The inert gas can be nitrogen or argon, preferably nitrogen.

The solution formed during the process of mixing Sugammadex or its salts, preferably Sugammadex sodium, with the water for injection having less than 100 ppm of oxygen, preferably less than 10 ppm of oxygen, more preferably less than 1 ppm of oxygen, is preferably bubbled with an inert gas, preferably nitrogen. The obtained solution is then preferably filtered and filled into vials. Finally, the vials can be sterilized by steam sterilisation upon heating in an autoclave, preferably at a temperature of 121° C. for 15 minutes, although other temperature and time conditions may also be used.

The pharmaceutical compositions according to the present invention are prepared by mixing Sugammadex or its salts, preferably Sugammadex sodium, obtained according to the process of the present invention with a pharmaceutically suitable liquid and optionally also with pharmaceutical suitable auxiliaries. e.g. as described in the standard reference, Gennaro et al., Remington's Pharmaceutical Sciences, (18th ed., Mack Publishing Company, 1990, Part 8: Pharmaceutical Preparations and Their Manufacture; see especially Chapter 84 on "Parenteral preparations, pp. 1545-1569; and Chapter 85 on "Intravenous admixtures", pp. 1570-1580). Preferably the pharmaceutical compositions according to the present invention are prepared by mixing Sugammadex or its salts, preferably Sugammadex sodium, obtained according to the process of the present invention with purified water.

Alternatively, the pharmaceutical compositions of the present invention may be presented in unit-dose or multi-dose containers, for example sealed vials and ampoules, and may be stored in a freeze dried (lyophilised) condition requiring only the addition of the sterile liquid carrier, for example, water prior to use.

In a further aspect the invention relates to a kit for providing neuromuscular block and its reversal comprising (a) a neuromuscular blocking agent, and (b) Sugammadex or its salts, preferably Sugammadex sodium, prepared according to the process of the present invention.

A preferred kit, according to the invention, contains a Sugammadex or its salts, preferably Sugammadex sodium, prepared according to the process of the present invention and a neuromuscular blocking agent which is selected from the group consisting of rocuronium, vecuronium, pancuronium, rapacuronium, mivacurium, atracurium, (cis) atracurium, tubocurarine and suxamethonium.

The term "about" when used in the present invention preceding a number and referring to it, is meant to designate any value which lies within the range defined by the number ±10% of its value, preferably a range defined by the number ±5%, more preferably range defined by the number ±2%, still more preferably a range defined by the number ±1%. For example "about 10" should be construed as meaning within the range of 9 to 11, preferably within the range of 9.5 to 10.5, more preferably within the range of 9.8 to 10.2, and still more preferably within the range of 9.9 to 10.1.

The following examples further illustrate the invention but, of course, should not be construed as in any way limiting its scope.

EXAMPLES

General Experimental Conditions:
HPLC Method Used for 6-Per-Deoxy-6-Per-Chloro-v-Cyclodextrin (Compound II-A)

The chromatographic separation was carried out using an Inertsil C8-3, 5 µm and 4.6×250 mm, at 30° C.

The Mobile phase was 0.08% v/v trifluoroacetic acid solution in gradient grade water/acetonitrile (50:50) v/v.

The chromatogram was run for 30 minutes.

The chromatograph was equipped with a ELSD or CAD detector. The flow rate was 1.0 mL/min.

Test samples had a concentration of 1 mg/mL and were prepared, for example, by dissolving 20 mg of sample in methanol in a 20 mL volumetric flask.

HPLC Method Used for the Mono-Sodium Salt of 3-Mercaptopropionic Acid (Formula IV-A)

The chromatographic separation was carried out using an Atlantis T3, 5 μm and 4.6×250 mm, at 20-25° C.

The mobile phase A was 10 mM phosphate buffer at pH 2.5.

The mobile phase B was gradient grade acetonitrile.

The chromatograph was programmed as follows: initial 10 min isocratic 95% mobile phase A; 10-25 min linear gradient to 80% phase A; 25-45 min isocratic 80% phase A; 45-50 min linear gradient to 95% phase A; 50-60 min isocratic 95% phase A.

The chromatograph was equipped with a UV Waters 2487 detector (210 nm). The flow rate was 1.0 mL/min.

The samples have a concentration of 15 mg/mL and were prepared, for example, by dissolving 150 mg in 10 mL of diluent (diluent: 1.0% v/v HCl solution in water/acetonitrile (6:4) v/v).

HPLC Method Used for Sugammadex Sodium (Compound I)

The chromatographic separation was carried out using an YMC Pack Pro C18 3 μm, 4.6×250 mm column, at 40° C.

The mobile phase A was 10 mM phosphate buffer at pH 2.

The mobile phase B was gradient grade methanol/acetonitrile (95:5) v/v mixture.

The chromatograph was programmed as follows: initial 4 min isocratic 65% mobile phase A; 4-8 min linear gradient to 60% phase A; 8-27 min isocratic 60% phase A; 27-85 min linear gradient to 50% phase A; 85-90 min isocratic 50% phase A; 90-95 min linear gradient to 65% phase A; 95-105 min isocratic 65% phase A.

The chromatograph was equipped with a UV Waters 2487 detector (210 nm). The flow rate was 0.95 mL/min.

The samples have a concentration of 8 mg/mL and were prepared, for example, by dissolving 80 mg in 10 mL of diluent (diluent: water/methanol (9:1) v/v).

X-Ray Powder Diffraction (XRPD):

The XRPD pattern was recorded on a Siemens D5000 diffractometer equipped with two symmetrically mounted vertical goniometers (Bragg-Brentano geometry) with horizontal sample stages, a X-ray tube, a high voltage generator (working at 45 kV and 35 mA) and standard scintillation detectors. Ni-filtered Cu-anode source was used and diffracted radiation was further monochromatized with a graphite crystal to avoid fluorescence effects [λ(Kα)=1.54056 Å]. The diffraction pattern was recorded including values of 2θ that range from 2 to 50° with a sampling rate of 0.02° per second and a step time of 1 second per step. The powdered sample was pressed between two glass plates, forming a film. DIFFRAC Plus measurement software with EVA evaluation software (Bruker) was used to record the data and for a primary analysis of the diffraction pattern. The equipment was periodically calibrated using quartz and silicon.

Example 1: Preparation of 6-per-deoxy-6-per-chloro-γ-cyclodextrin (Compound II-A)

24.0 g of γ-cyclodextrin (water content below 0.5%) and 13.5 g (314.5 mmol) of lithium chloride were dissolved in 840 mL of N,N-dimethylformamide at 20-25° C., under nitrogen atmosphere. 24.4 mL of methanesulfonyl chloride were added and the resulting mixture was heated to 60-70° C. and stirred at this temperature until completing the reaction. The mixture was cooled down to 25° C. The resulting mixture was diluted with acetone and basified with aqueous sodium hydroxide until pH 8. The solid was isolated by filtration and washed with acetone. HPLC purity: 98.1%. The crude solid was slurried in a mixture of 50 mL of methanol, 125 mL of acetone and 125 mL of deionized water. The resulting suspension was filtered, and the solid was washed with acetone and dried under vacuum until constant weight to give 20 g of 6-per-deoxy-6-per-chloro-γ-cyclodextrin. Yield: 75%. Purity (HPLC): 99.5%.

Example 2: Preparation of 6-per-deoxy-6-per-chloro-γ-cyclodextrin (Compound II-A)

29.0 Kg of dry γ-cyclodextrin (water content below 0.5%) and 16.2 Kg of Lithium chloride were dissolved in 1014 L of N,N-dimethylformamide at 20-25° C., under nitrogen atmosphere. 60.5 Kg of methanesulfonyl chloride were added and the resulting mixture was heated to 60-70° C. and stirred at this temperature until completing the reaction. The mixture was cooled down to 25° C. The resulting mixture was diluted with acetone and basified to pH>12 with aqueous sodium hydroxide. The mixture was then cooled to −10° C., the pH was driven to 8.5 with aqueous hydrochloric acid and filtered. The mixture was suspended in a mixture of 58 L of methanol and 145 L of water and pH was driven to <1.0 with aqueous hydrochloric acid. The mixture was heated at 50° C. for 5 h, then cooled back to 20-25° C. and 145 L of acetone were added. The mixture was cooled to −10° C. and filtered. The solid was suspended in 58 L of methanol. 145 L of water were added and the pH was adjusted to 8.5 with sodium hydroxide. 145 L of acetone were added. The mixture was cooled to −10° C., filtered and dried. Yield 70.9%.

Example 3: Preparation of 6-per-deoxy-6-per-chloro-γ-cyclodextrin (Compound II-A)

5.0 g of dry γ-cyclodextrin were dissolved in 175 mL of N,N-dimethylformamide under nitrogen at room temperature. After dissolution, 5.09 mL of methanesulfonyl chloride were added. The reaction mixture was heated to 65° C. and stirred until completing the reaction. The mixture was cooled to 20-25° C. and 100 mL of acetone followed by 100 mL of water were added. 8 mL of NaOH 50% w/v were added dropwise and then HCl 5M were added to the above suspension until pH=8. The resulting slurry was stirred at room temperature for 30 minutes and filtered. The resulting solid was washed with acetone and dried under vacuum until constant weight to give crude 6-per-deoxy-6-per-chloro-γ-cyclodextrin. Purity (HPLC): 94.0%.

Example 4: Preparation of the Mono-Sodium Salt of 3-Mercaptopropionic Acid (Compound IV-A)

50 g of 3-mercaptopropionic acid (471.08 mmol) were dissolved in 200 mL of isopropanol. The resulting solution was stirred for at least 10 minutes at 20-25° C. 19 g of sodium hydroxide solid (granules) were added at 20-30° C. The resulting suspension was stirred at 20-25° C. for 2 h. Afterwards, 25 mL of n-heptane were added and the suspension was cooled down to 5-10° C. After stirring it to 5-10° C. for 1 h, the precipitated solid was filtered, washed with n-heptane and dried under vacuum at 60-65° C. for a minimum of 4 h to get 48.3 g of the title compound. Yield: 80%. Purity (HPLC): 98.68%.

Example 5: Preparation of the Mono-Sodium Salt of 3-Mercaptopropionic Acid (Compound IV-A)

90 g of 3-mercaptopropionic acid (847.94 mmol) were dissolved in 360 mL of isopropanol. The resulting solution was stirred for at least 10 minutes at 20-25° C. 32.5 g of sodium hydroxide solid (granules) were added at 20-30° C. The resulting suspension was stirred at 20-25° C. for 2 h. Afterwards, 44 mL of n-heptane were added and the suspension was cooled down to 5-10° C. After stirring it to 5-10° C. for 1 h, the precipitated solid was filtered, washed with n-heptane and dried under vacuum at 60-65° C. for a minimum of 4 h to get 82.6 g of the title compound. Yield: 76%. Purity (HPLC): 97.60%.

Example 6: Preparation of Sugammadex Sodium (Compound I) Isolating the Mono-Sodium Salt of 3-Mercaptopropionic Acid (Compound IV-A)

A round-bottomed flask was charged with 14.19 g of mono-sodium 3-mercaptopropionate salt, prepared according to Example 4, 120 mL of N,N-dimethylformamide and 30 mL of methanol. A solution of 10 g of 6-per-deoxy-6-per-chloro-gamma-cyclodextrin, prepared according to Example 1, in 80 mL of N,N-dimethylformamide was added to the above solution at 20-25° C. under nitrogen. After stirring for 15 minutes, 4.43 g of NaOH (granules) were added in portions at 20-25° C. under nitrogen. The resulting mixture was stirred for 1 h at 20-30° C. The resulting suspension was stirred for 6 h at 95-100° C. followed by 10 h at 105-110° C. After cooling it down to 20-25° C., 50 mL of water and 100 mL of methanol were added and pH was adjusted to 8±0.5 by adding hydrochloric acid 4-5 M. The precipitated solid was collected by filtration and washed with methanol. Purity (HPLC): 95.14%.

Example 7: Purification of Sugammadex Sodium (Compound I)

Sugammadex sodium obtained in Example 6 was dissolved in 30 mL of deionized water and precipitated by adding 200 mL of methanol under nitrogen at 20-25° C. The resulting suspension was filtered and washed with methanol to obtain a wet solid. Purity (HPLC): 95.57%.

The obtained solid was dissolved in 30 mL of deionized water and precipitated by adding 200 mL of methanol under nitrogen at 20-25° C. The resulting suspension was filtered and washed with methanol to obtain 13.58 g of wet solid. Purity (HPLC): 97.70%.

The 13.58 g wet Sugammadex sodium were dissolved in 30 mL of deionized water under nitrogen at 20-25° C. After dissolution, pH was adjusted to 9.75±0.25 by adding sodium hydroxide 1 M. A solution of 24.1 mg of methyl acrylate in 5.59 mL of methanol was slowly added to the above solution keeping the temperature between 20-25° C. The resulting solution was stirred for 2 h at 20-25° C. After completion of the reaction, 30 mL of n-heptane were added and the resulting biphasic solution was stirred for 2 h at 20-25° C. Afterwards, 170 mL of methanol were added. The resulting precipitate was stirred for 1 h at 20-25° C., filtered and washed with methanol to obtain 10.36 g of wet Sugammadex solid. Purity (HPLC): 98.42%.

The resulting wet solid was dissolved in 45 mL of deionized water under nitrogen at 20-25° C. After dissolution, pH was adjusted to 11.75±0.25 by adding sodium hydroxide 1 M. The resulting solution was stirred for 4 h at 20-25° C., filtered and washed with 5 mL of deionized water to get a clear solution. The filtrate was stirred at 20-25° C. and 10 mL of ethanol were added to the filtrate. The resulting solution was slowly added to 50 mL of ethanol, followed by addition of 100 mL of ethanol at 20-25° C. The contents were stirred for 1 h at the same temperature, filtered, washed with ethanol and dried under vacuum at 70-75° C. to obtain 7.38 g of Sugammadex sodium. Purity (HPLC): 99.28%. X-Ray Powder Diffraction: See Table 1 and FIG. 3.

TABLE 1

| Peak No. | degrees 2θ | d (Å) |
|---|---|---|
| 1 | 4.76 | 18.56 |
| 2 | 5.47 | 16.13 |
| 3 | 7.46 | 11.85 |
| 4 | 7.95 | 11.11 |
| 5 | 8.94 | 9.88 |
| 6 | 9.97 | 8.86 |
| 7 | 10.39 | 8.50 |
| 8 | 11.69 | 7.56 |
| 9 | 12.46 | 7.10 |
| 10 | 12.86 | 6.88 |
| 11 | 15.24 | 5.81 |
| 12 | 16.02 | 5.53 |
| 13 | 17.54 | 5.05 |
| 14 | 19.18 | 4.62 |
| 15 | 20.04 | 4.43 |
| 16 | 20.24 | 4.38 |

Example 8: Preparation of Sugammadex Sodium (Compound I) Isolating the Mono-Sodium Salt of 3-Mercaptopropionic Acid (Compound IV-A)

A reactor was charged with 1.42 Kg of mono-sodium 3-mercaptopropionate salt, prepared according to Example 5, 12 L of N,N-dimethylformamide and 3 L of methanol. A solution of 1 Kg of 6-per-deoxy-6-per-chloro-gamma-cyclodextrin, prepared according to Example 1, in 8 L of N,N-dimethylformamide was added to the above solution at 20-25° C. under nitrogen. After stirring for 15 minutes, 440 g of NaOH (granules) were added in portions at 20-25° C. under nitrogen. The resulting mixture was stirred for 1 h at 20-30° C. The resulting suspension was stirred for 6 h at 95-100° C. followed by 10 h at 105-110° C. After cooling it down to 20-25° C., 5 L of water and 10 L of methanol were added and pH was adjusted to 8±0.5 by adding hydrochloric acid 5 M. The precipitated solid was collected by filtration and washed with methanol. Purity (HPLC): 95.9%.

Example 9: Purification of Sugammadex Sodium (Compound I)

Sugammadex sodium obtained in Example 8 was dissolved in 3 L of deionized water and precipitated by adding 19.8 L of methanol under nitrogen at 20-25° C. The resulting suspension was filtered and washed with methanol to obtain a wet solid.

The obtained solid was dissolved in 3 L of deionized water and precipitated by adding 19.8 L of methanol under nitrogen at 20-25° C. The resulting suspension was filtered and washed with methanol to obtain a wet solid.

The wet Sugammadex sodium obtained was dissolved in 3 L of deionized water under nitrogen at 20-25° C. After dissolution, pH was adjusted to 9.75±0.25 by adding sodium hydroxide 4 M. A solution of 2.4 g of methyl acrylate in 0.56 L of methanol was slowly added to the above solution keeping the temperature between 20-25° C. The resulting solution was stirred for 4 h at 20-25° C. After completion of the reaction, 3 L of n-heptane were added and the resulting mixture was stirred for 2 h at 20-25° C. Afterwards, 17 L of methanol were slowly added. The resulting precipitate was stirred for 1 h at 20-25° C., filtered and washed with methanol to obtain wet Sugammadex sodium solid.

The resulting wet solid was dissolved in 4.5 L of deionized water under nitrogen at 25-30° C. After dissolution, pH was adjusted to 11.75±0.25 by adding sodium hydroxide.

The resulting solution was stirred for 4 h at 25-30° C. The pH was then adjusted to 9.25±0.25 at 25-30° C. by adding hydrochloric acid. The solution was filtered and washed with 0.5 L of deionized water to get a clear solution. The filtrate was stirred at 20-25° C. and 1 L of ethanol were added to the filtrate. The resulting solution was slowly added to 5 L of ethanol, followed by addition of 1 L of ethanol at 20-25° C. The contents were stirred for 1 h at the same temperature, filtered, washed with ethanol and dried under vacuum at 70-75° C. to obtain 0.867 Kg of Sugammadex sodium. Purity (HPLC): 98.90%.

Example 10: Comparative Hygroscopicity Study of the Mono-Sodium Salt of 3-Mercaptopropionic Acid (Compound IV-A) and the Di-Sodium Salt of 3-Mercaptopropionic Acid (Compound V-A) Obtained According to WO 2017/163165 A1

Hygroscopic properties of both the mono-sodium of 3-mercaptopropionic acid (compound IV-A), obtained as it is disclosed in examples 4 or 5, and di-sodium salt of 3-mercaptopropionic acid (compound (V-A), obtained according to WO 2017/163165 A1, were measured according to the hygroscopicity method of the European Pharmacopoeia 5.0, which is used to provide an indication of the degree of hygroscopicity of the samples.

A glass weighing vessel having 50 mm in external diameter and 15 mm high and the stopper were weighed (m1). The sample to be tested was placed in the vessel and the stoppered vessel with the sample was weighed (m2). The unstoppered vessel with the sample was placed in a dissicator at 25° C. containing a saturated solution of ammonium chloride in order to keep 80±2% relative humidity. The weighing vessel with the sample and the stopper were weighted at different times (m3).

The gain of weight for each sample at a certain time was calculated using the following expression:

$$\frac{m3 - m2}{m2 - m1} \times 100$$

Table 2 shows the results obtained for each salt:

TABLE 2

|  | t (h) | Compound IV-A | Compound V-A | Weight gain (%) Compound IV-A | Weight gain (%) Compound V-A |
|---|---|---|---|---|---|
| m1 (g) |  | 13.7061 | 13.0450 |  |  |
| m2 (g) | 0 | 15.7344 | 15.1057 | 0.0000 | 0.0000 |
| m3 (g) | 0.5 | 15.7558 | 15.1363 | 1.0551 | 1.4296 |
|  | 1 | 15.7684 | 15.1595 | 1.6763 | 2.5134 |
|  | 2 | 15.8101 | 15.2328 | 3.7322 | 5.9379 |
|  | 3 | 15.8606 | 15.3203 | 6.2220 | 10.0257 |
|  | 4 | 15.8935 | 15.3785 | 7.8440 | 12.7447 |
|  | 5 | 15.9421 | 15.4588 | 10.2401 | 16.4961 |
|  | 6.5 | 15.9956 | 15.5380 | 12.8778 | 20.1962 |

The results are represented in FIG. 4 showing the percentage increase in weight of the mono-sodium salt of 3-mercaptopropionic acid (compound IV-A), and the di-sodium salt of 3-mercaptopropionic acid (compound V-A), during the hydration process at 80±2% relative humidity (RH) and at 25° C. as happens immediately after drying. A lower gain of weight at the same relative humidity means a lower risk on introducing uncontrolled amount of extra water during the handling. Therefore, mono-sodium salt is preferred for this reaction.

Data show that the mono-sodium salt (Compound IV-A) is less hygroscopic than the di-sodium salt (Compound V-A).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A process for the preparation of Sugammadex or its salts, which comprises:

a) reacting 3-mercaptopropionic acid of formula (III)

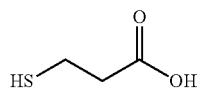

(III)

with an ionic base to obtain the mono-salt of formula (IV),

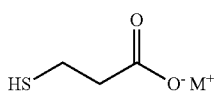

(IV)

wherein M is an alkaline metal;

b) isolating the mono-salt of formula (IV);
   c) reacting the mono-salt of formula (IV) with the compound of formula (II) or a hydrate or solvate thereof, in the presence of an ionic base,

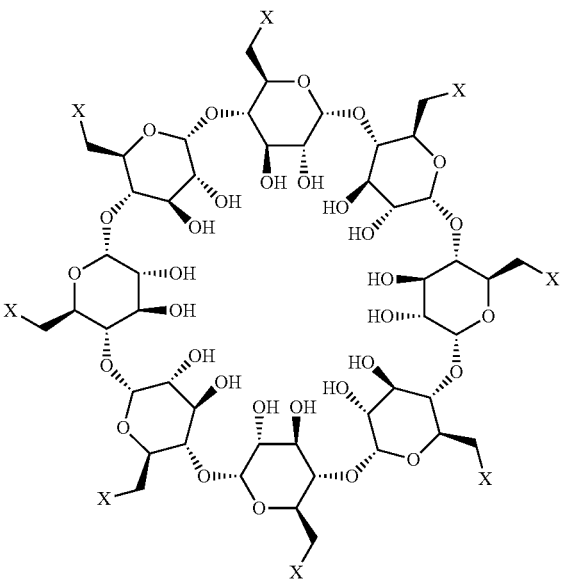

(II)

wherein X is Cl, Br, I, or $OSO_2R$, wherein R is $C_1$-$C_4$ alkyl, optionally substituted by F, Cl, Br or I; phenyl or $C_1$-$C_4$ alkyl-phenyl.

2. The process according to claim 1, wherein the Sugammadex salt is Sugammadex sodium.

3. The process according to claim 2, wherein the mono-salt of formula (IV) is the mono-sodium salt of formula (IV-A)

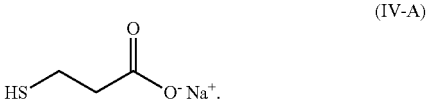

(IV-A)

4. The process according to claim 3, wherein the mono-sodium salt of formula (IV-A) is characterized by having X-ray powder diffraction (XRPD) pattern comprising peaks at 6.1 and 24.9±0.2° 2-theta (2θ)).

5. The process according to claim 2, wherein the ionic base of step a) and step c) is a sodium ionic base.

6. The process according to claim 5, wherein the ionic base of step a) and step c) is sodium hydroxide.

7. The process according to claim 6, wherein the sodium hydroxide used in step a) and c) is used in solid form.

8. The process according to claim 2, wherein step a) is carried out in isopropanol.

9. The process according to claim 2, wherein step c) is carried out in a mixture of N,N-dimethylformamide and methanol.

10. The process according to claim 2, wherein step c) takes place at a temperature of between 95° C. to 110° C.

11. The process according to claim 10, wherein step c) takes place for 4 to 8 hours at 95 to 100° C., followed by 8 to 12 hours at 105 to 110° C.

12. The process according to claim 2, wherein the compound of formula (II) or a hydrate or solvate thereof is selected from the group consisting of 6-per-deoxy-6-per-chloro-γ-cyclodextrin, 6-per-deoxy-6-per-bromo-γ-cyclodextrin and 6-per-deoxy-6-per-iodo-γ-cyclodextrin or a hydrate or solvate thereof.

13. The process according to claim 12, wherein the compound of formula (II) or a hydrate or solvate thereof is 6-per-deoxy-6-per-chloro-γ-cyclodextrin, compound of formula (II-A)

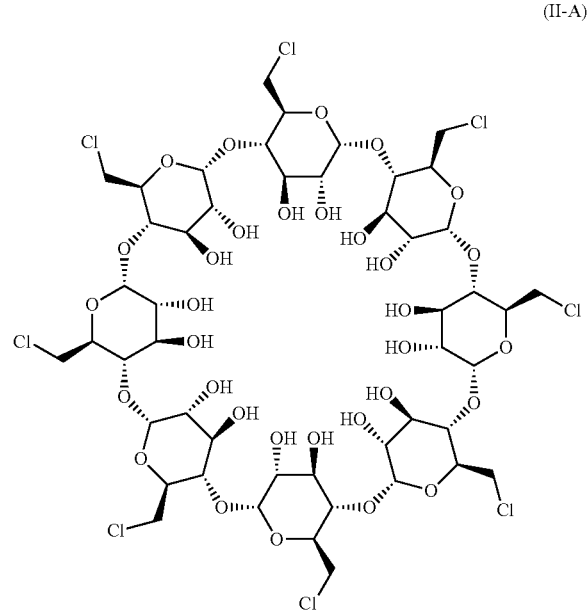 [SMILES: O[C@@H]1[C@@H](O)[C@H]2O[C@H]3[C@H](O)[C@@H](O)[C@@H](O[C@H]4[C@H](O)[C@@H](O)[C@@H](O[C@H]5[C@H](O)[C@@H](O)[C@@H](O[C@H]6[C@H](O)[C@@H](O)[C@@H](O[C@H]7[C@H](O)[C@@H](O)[C@@H](O[C@H]8[C@H](O)[C@@H](O)[C@@H](O[C@H]9[C@H](O)[C@@H](O)[C@@H](O[C@@H]1[C@@H](CCl)O2)O[C@@H]9CCl)O[C@@H]8CCl)O[C@@H]7CCl)O[C@@H]6CCl)O[C@@H]5CCl)O[C@@H]4CCl)O[C@@H]3CCl]

(II-A)

or a hydrate or solvate thereof.

14. The process according to claim 13, wherein the compound of formula (II-A) or a hydrate or solvate thereof is prepared by a process comprising the following steps:
   a) reacting a sulfonyl chloride with a tertiary amide compound to form a Vilsmeier reagent; and
   b) reacting the Vilsmeier reagent with γ-cyclodextrin.

15. The process according to claim 14, wherein the sulfonyl chloride is selected from the group comprising methanesulfonyl chloride, ethanesulfonyl chloride, allylsulfonyl chloride, 1-propanesulfonyl chloride, benzenesulfonyl chloride, toluenesulfonyl chloride, 4-ethylbenzenesulfonyl chloride, m-xylene-4-sulfonyl chloride, p-xylene-2-sulfonyl chloride, 4-dodecylbenzenesulfonyl chloride, 2-mesitylenesulfonyl chloride, 2,3,5-trichlorobenzenesulfonyl chloride, 2,4-dinitrobenzenesulfonyl chloride, 4-bromobenzenesulfonyl chloride, 4-chlorobenzenesulfonyl chloride, heptadecafluorooctanesulfonyl chloride, 1-naphthalenesulfonyl chloride, 2-naphthalenesulfonyl chloride, 1,3,6-naphthalenetrisulfonyl chloride, 2,6-naphthalenedisulfonyl chloride, 1,5-naphthalenedisulfonyl chloride, 1-pyrenesulfonyl chloride, and/or mixtures thereof.

16. The process according to claim 14, wherein the sulfonyl chloride is methanesulfonyl chloride.

17. The process according to claim 14, wherein the tertiary amide compound is selected from the group comprising N,N-dimethylformamide, N,N-dimethylacetamide, N-methyl-2-pyrrolidone, and/or mixtures thereof.

18. The process according to claim 16, wherein the tertiary amide is N,N-dimethylformamide.

19. The process according to claim 14, wherein the reaction between the Vilsmeier reagent and γ-cyclodextrin of step (b) is carried out in the presence of a chloride salt selected from the group comprising lithium chloride, sodium chloride, potassium chloride, cesium chloride, magnesium chloride, calcium chloride, a quaternary ammonium chloride, and/or mixtures thereof.

20. The process according to claim 18, wherein the chloride salt is lithium chloride.

21. The process according to claim 2, further comprising the purification of Sugammadex sodium by recrystallization or slurrying in mixtures of water and methanol or ethanol, optionally also using heptane.

22. The process according to claim 4, wherein the monosodium salt of formula (IV-A) is characterized by having X-ray powder diffraction (XRPD) pattern further comprising peaks 6.1, 6.6, 24.9, 27.6, 30.2, 30.7 and 37.7±0.2° 2-theta (2θ).

* * * * *